L. T. LOWE.
MOLDING MACHINE.
APPLICATION FILED MAR. 7, 1911.
1,025,579.
Patented May 7, 1912.
4 SHEETS—SHEET 1.
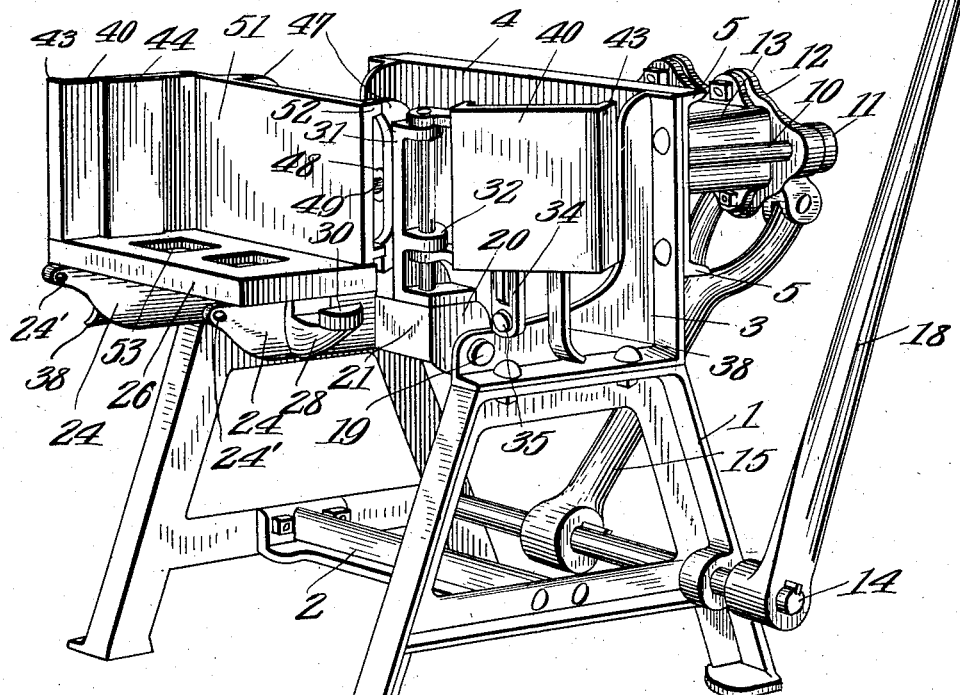
Fig. 1.
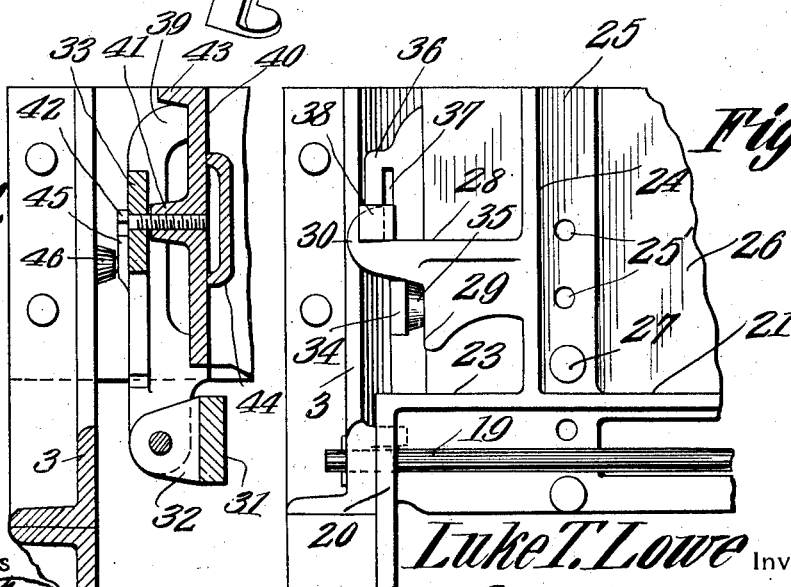
Fig. 4.
Fig. 5.
Witnesses
Luke T. Lowe Inventor,
by C. A. Snow & Co.
Attorneys

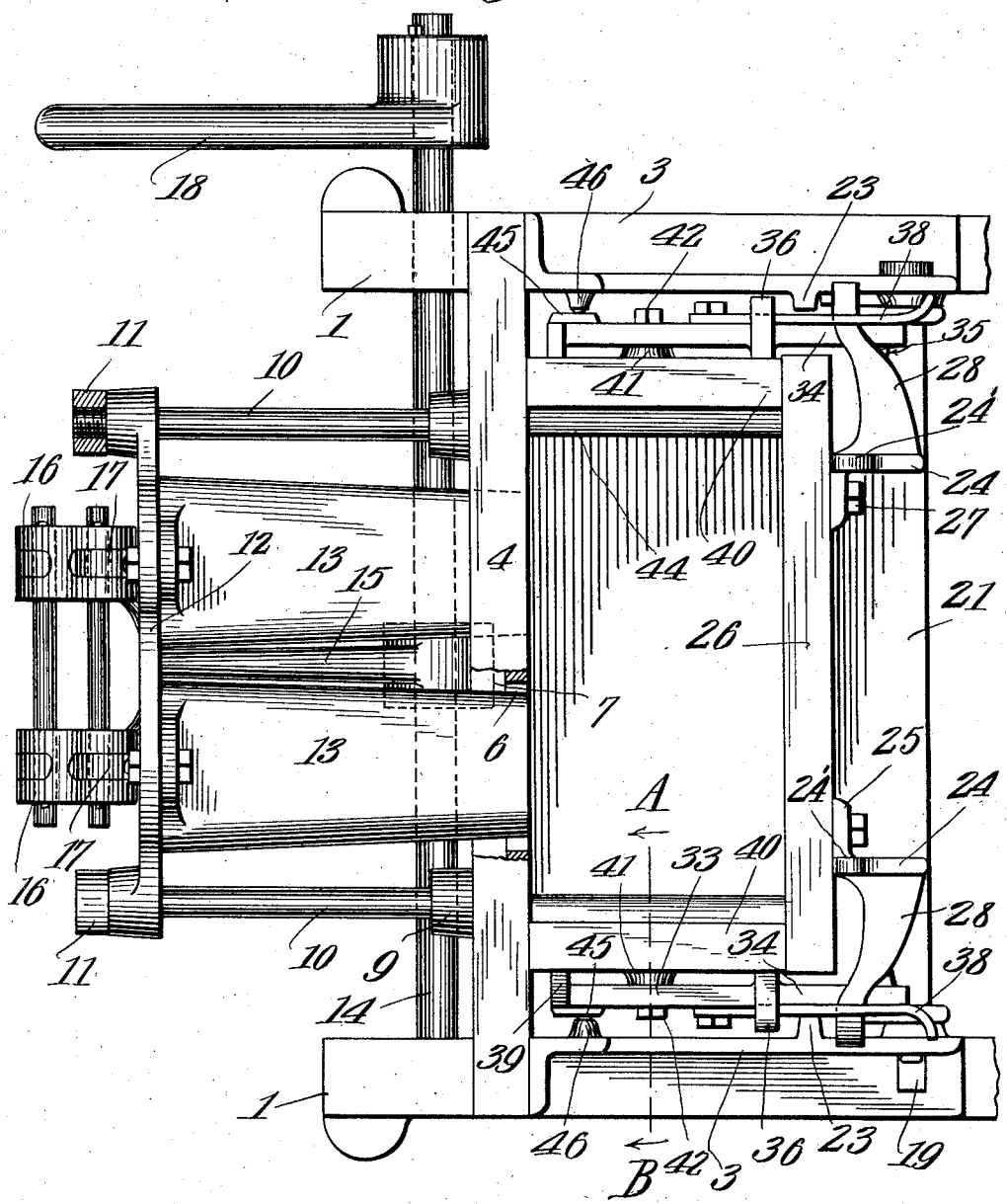

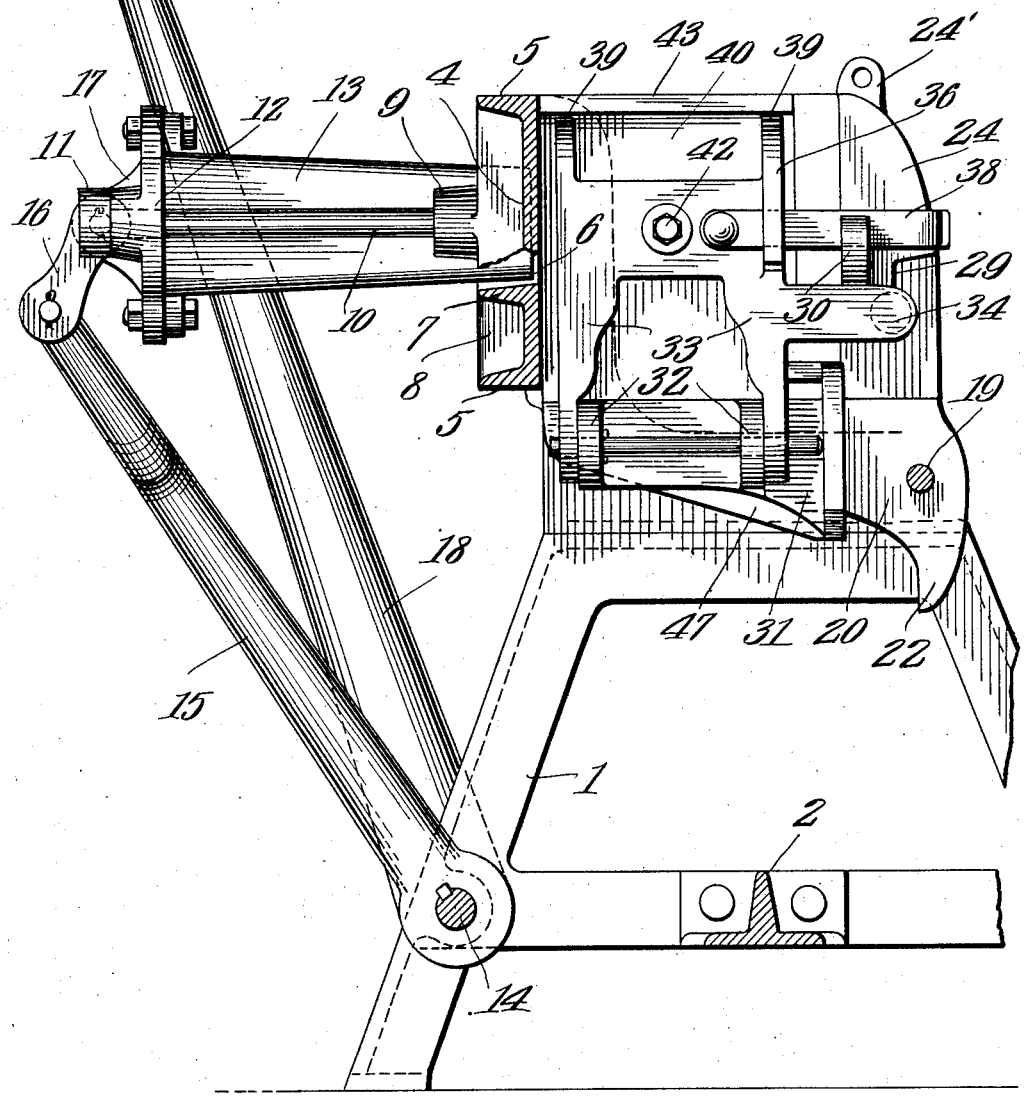

L. T. LOWE.
MOLDING MACHINE.
APPLICATION FILED MAR. 7, 1911.
1,025,579.
Patented May 7, 1912.
4 SHEETS—SHEET 4.
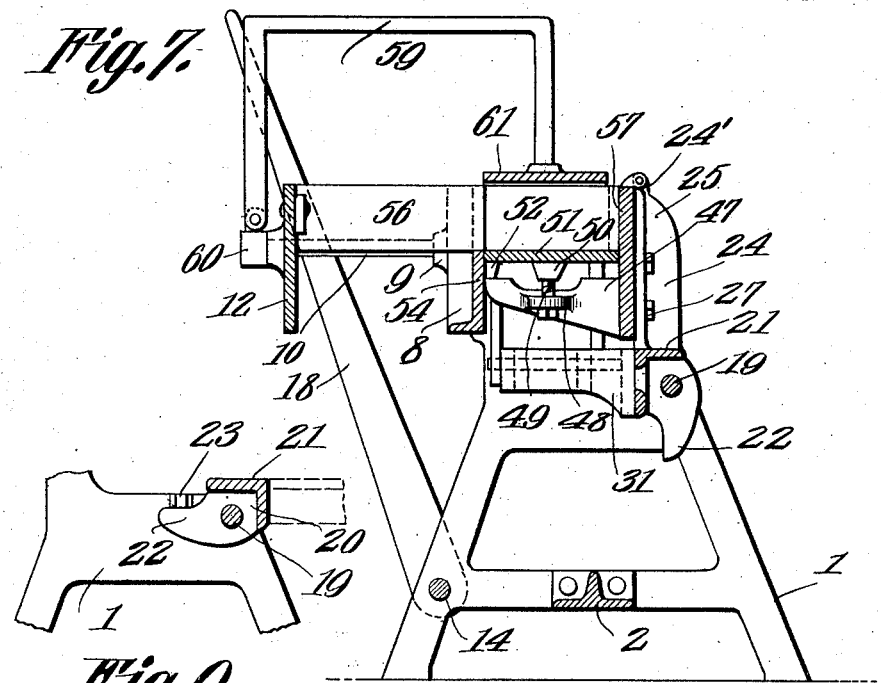
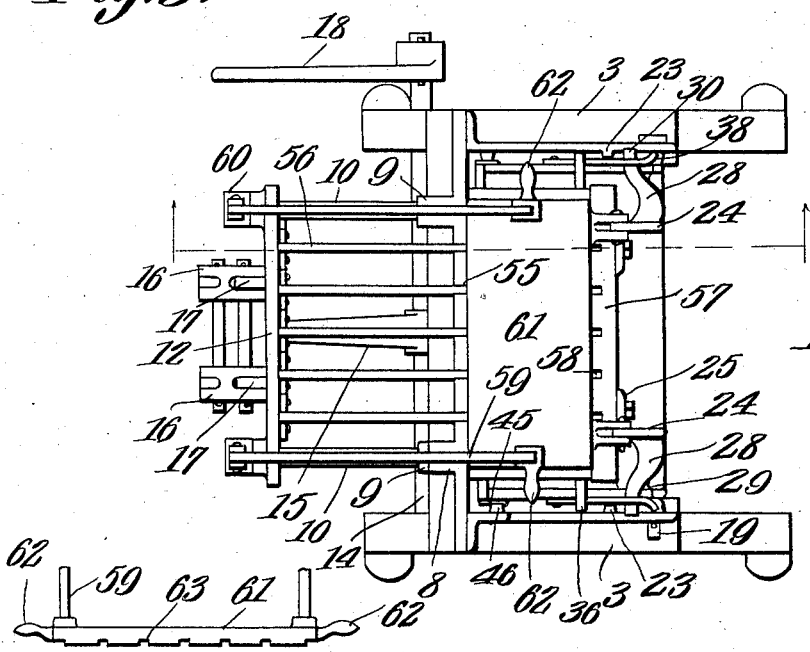
Witnesses
Luke T. Lowe, Inventor,
by C. A. Snow & Co.
Attorneys.

UNITED STATES PATENT OFFICE.

LUKE T. LOWE, OF BRISTOL, TENNESSEE, ASSIGNOR TO DIAMOND BLOCK MACHINE COMPANY, INCORPORATED, OF BRISTOL, VIRGINIA.

MOLDING-MACHINE.

1,025,579.  Specification of Letters Patent.  Patented May 7, 1912.

Application filed March 7, 1911. Serial No. 612,774.

*To all whom it may concern:*

Be it known that I, LUKE T. LOWE, a citizen of the United States, residing at Bristol, in the county of Sullivan and State of Tennessee, have invented a new and useful Molding-Machine, of which the following is a specification.

This invention relates to molding machines, one of its objects being to provide a machine of this type which can be used either for producing hollow concrete blocks or for forming bricks and other articles of plastic material.

Another object is to provide a molding machine the box or mold portion of which can be readily tilted out of normal position so as to permit the contents thereof to be easily removed without injury.

Another object is to provide a molding machine the box or mold portion of which is made up of movably connected parts, there being means coöperating with these parts for binding them firmly together while the plastic material is being placed within the mold.

A still further object is to provide a mold having interchangeable adjustably supported face plates which can be readily placed in or removed from position.

Another object is to provide improved means for shifting the cores of the mold into and out of operative position and for properly supporting said cores.

With the foregoing and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings the preferred forms of the invention have been shown.

In said drawings:—Figure 1 is a perspective view of the molding machine, the box or mold portion being supported in delivering position, one of the end panels being open. Fig. 2 is a plan view of the complete machine, certain parts being broken away and the cores being shown in position within the mold. Fig. 3 is a view partly in side elevation and partly in section of the machine with the parts in the positions shown in Fig. 2. Fig. 4 is a section on line A—B Fig. 2. Fig. 5 is a front elevation of one side portion of the mold. Fig. 6 is a plan view of the machine with the parts arranged to produce bricks. Fig. 7 is a section through the machine shown in Fig. 6. Fig. 8 is a front elevation of the tamping head. Fig. 9 is a section through the tiltable angle bar and showing one of its wings and the stop lug coöperating therewith.

Referring to the figures by characters of reference 1 designates A frames constituting the supports of the machine, these frames being connected by a cross bar 2. Mounted on each of the frames 1 is an angular flanged frame member 3, the two frame members being connected at the back by a plate 4 preferably reinforced by upper and lower longitudinally extending flanges 5. This plate constitutes one wall or panel of the mold and has one or more openings 6 therein. A combined guide and reinforcing lip 7 is arranged under each of the openings 6 and the said openings are interposed between reinforcing webs 8 connecting the flanges 5. An enlargement 9 extends from each web and has a guide rod 10 extending from it, said rod being provided, at its free end, with a removable head 11 constituting a stop. A cross head 12 is slidably mounted on the two guide rods 10 and has cores 13 detachably connected to it, the free ends of the cores being normally mounted upon the lips 7 and within the openings 6. It is to be understood that the plate 4 is detachably connected to the frames 3 and, therefore, plates having openings 6 of different shapes may be substituted therefor, and, as the cores 13 are detachably connected to the cross head 12, it will be apparent that other cores, shaped to conform with the openings in the plate 4, can be attached to the cross head. A shaft 14 is journaled within the frames 1 and has a forked arm 15 keyed or otherwise secured thereto and extending upwardly therefrom, the upper forked end of the arm being connected, by links 16, to ears 17 extending from the cross head 12. An operating lever 18 is keyed or otherwise connected to the shaft 14 and by swinging this lever, the arm 15 can be actuated so as to move the cross head 12 and the cores 13, in either direction along the guide rods 10.

A pivot rod 19 is mounted within the front end portions of the frame pieces 3 and is pivotally engaged by ears 20 formed at the ends of an angle bar 21 interposed between the frame members 3. Each ear has a wing 22 projecting therefrom and designed, when the angle bar is swung to one position, to move into contact with and be held by stop lugs 23 extending inwardly from the frame members 3. Arms 24, preferably parallel, extend perpendicularly from one face of the angle bar 21 and have apertured flanges 25 to which a pallet 26 of any suitable material, may be secured by means of screws 27 or the like. Fingers 28 extend laterally from the arms 24 and each has a stop shoulder 29 at a point between the ends thereof and a latch member 30 at the free end of the finger, said member being for the purpose hereinafter set forth. Arms 31 extend perpendicularly from the end portions of the angle bar 21 and are disposed at right angles to the arms 24, these arms 31 being provided with outwardly extending ears 32 to which end frames 33 are pivotally connected. Each of these frames has a tongue 34 extending therebeyond and designed to move against one of the stop shoulders 29, said tongue having a stud 35 for engaging the shoulder as indicated in Fig. 5. A guide ear 36 is also formed on or secured to each frame 33 and has a slot 37 therein. A pivoted latch member 38 is connected to the frame 33 and moves within the slot 37, this latch member being adapted to engage the latch member 30 in the path thereof and thus lock its frame 33 with the stud 35 in contact with shoulder 29.

Each frame 33 has spaced backing ears 39 adapted to be contacted by the end plate 40 of the mold and a stud 41 may be formed on the outer face of the plate 40 for the reception of a fastening screw 42 or the like engaging the frames 33 and whereby the plate may be securely fastened to the frames. The said plate 40 is preferably formed with a flange 43 along that edge thereof adapted to be contacted by the pallet 26. Shaping plates 44 of any desired contour may be detachably fastened to the inner or working faces of the plates 40, any suitable means being provided for this purpose.

Each of the frames 33 has a beveled wedging projection 45 thereon adjacent that edge thereof farthest removed from the latch strip 38 and these projections are adapted, when the arms 31 are swung downwardly, to move between and frictionally engage supporting and binding lugs 46 extending inwardly from the frame members 3, the parts thus coöperating to prevent the end plates 40 from spreading apart while the mold is being filled.

Extending from the tiltable angle bar 21 close to and between the arms 31 are brackets 47 each of which has an ear 48 for the reception of a fastening screw 49 or the like adapted to enter and engage studs 50 formed upon the lower or outer face of a face plate 51. This face plate may have its inner or working surface shaped so as to give any desired contour to the outer face of the block to be produced within the mold. Spacing studs 52 may be extended from the corner portions of this face plate and are designed to bear on the end portion of the brackets 47. Obviously, the face plate 51 can be readily removed and another one substituted therefor.

As shown in Fig. 1 the pallet 26 is preferably formed with openings 53 designed to receive the free end portions of the cores 13 so as to support them within the mold.

When it is desired to use the mold a face plate of the desired form is fastened to the brackets 47 in the manner hereinbefore described, cores of a desired shape are secured to the cross head 12, and a plate 4 and a pallet 26 having openings therein corresponding with the transverse contour of the cores, are attached to the frame members 3 and to the arms 24 respectively. End plates 40 are then secured to the frames 33 and these plates may be provided with working faces designed to give the ends of the blocks any appearance desired. For example said end plates may be recessed and roughened so as to give a bulged roughened effect to the end of the block or shaping plates, such as indicated at 44, may be secured to the end plates so as to form recesses in the ends of the blocks. After the various plates have been properly assembled, the end frames 33 are swung relative to the angle bar 21 so as to bring their tongues 34 against the stop shoulders 29, thus bringing the pivoted latch 38 into engagement with the latch members 30 and holding the end plates 40 against movement. The angle bar 21 is then swung about its pivot to bring the frames 33 between the upstanding portions of the frame members 3 and with the beveled projections 45 in frictional engagement with the studs 46, as indicated in Figs. 2 and 4. The cores 13 are then shifted into the mold until their free ends are brought into the openings 53, this movement of the cores being effected by means of the lever 18 and the parts actuated thereby. After the core has been shifted into the mold, the plastic material is poured into said mold and leveled off at the top. After the material has properly set the cores are withdrawn from the mold by reversing the movement of the lever. The entire mold is then swung about the pivot of the angle bar 21, the wings 22 moving upwardly against the stop projections or lugs 23 and the arms 24 moving downwardly until they assume substantially horizontal positions with the pallet 26 lowermost and the face plate 51 and the end plates 40 upstanding therefrom. Plates 4 of course remain fixed relative to the supporting frames and the frame members 3. After the mold has thus been tilted so as to bring the pallet lowermost, the latch strips 38 are disengaged from the latch members 30, thus permitting the frames 33 and the end plates 40 to swing outwardly away from the blocks on the pallet. Said pallet can then be detached from the flanges 25 and slid off of the arms 24, thus withdrawing the block from the face plate 51. Another pallet can then be placed on the machine and secured after which, the foregoing operation can be repeated.

As has heretofore been stated the machine herein described can also be used for manufacturing bricks. When the machine is to be used for this purpose the plate 4 is removed and another plate 54 is substituted therefor, this last mentioned plate being formed with parallel slots 55 extending thereinto from the upper edge thereof and spaced apart a distance equal to the width of the brick to be produced. The cores 13 are disconnected from the head 12 and other cores, in the form of parallel flat partition strips 56, are secured to the cross head and disposed with their free ends normally in the slots 55. The brackets 47 are adjusted along the flanges 25 until the face plate 51 mounted thereon is supported at the proper distance from the top of the mold, this adjustment being permissible in view of the fact that the flanges 25 are formed with series of openings 25' for the reception of fastening devices engaging the brackets 47. A pallet 57 is hingedly connected to ears 24' extending from the ends of arms 24, this pallet being designed to rest flat upon the inner faces of the flanges 25 and to lie in the path of the division strips or cores 56, there being grooves 58 within the pallet for the reception of the end portions of said strips.

Angular arms 59 are pivotally connected to sleeves 60 adapted to be secured to the ends of the guide rods 10 and these arms overhang the face plate 51 and are connected to a tamping head 61.

In using the machine to form bricks, the partition strips or cores 56 are shifted into the mold so as to seat the free ends thereof within the grooves 58, this movement being effected by means of the lever 18. The plastic material is then placed between the strips 56 and above the face plate 51 and is tamped by means of the head 61, this head being moved downwardly by hand, there being grips 62 projecting from the ends thereof, as indicated in Fig. 8. Moreover, grooves 63 may be formed in the lower face of the tamping head, so as to receive the upper edge portions of the strips 56. After the material has been properly tamped, the strips or cores 56 are withdrawn from the mold, the tamping head 61 is swung backwardly away from the mold, and said mold is swung so as to bring the arms 24 in substantially horizontal positions. Pallet 57 will thus be brought to position under the bricks and by placing a supplemental pallet or board, not shown, upon the upstanding front faces of the bricks and then swinging the pallet 57 upon the ears 24', said bricks can be readily transferred from the pallet 57 to the board and thus conveyed to a point for drying.

It will be apparent that other articles than bricks and blocks can be formed in the machine and that the only changes necessary will be the substitution of cores, face plates and other removable and adjustable parts so as to produce an article of the desired contour.

The machine is very compact in construction and will not readily get out of order.

Although the frame members 3 have been shown and described as formed separately from the supporting frames 1 and secured to them, it is to be understood that, if desired, these frame members can be formed integral with the supporting frames.

What is claimed is:—

1. The combination with a supporting structure, and angular frame members secured thereon, of a back plate connecting the frame members and constituting the fixed wall of a mold, said plate having a core receiving opening therein, a core movable into and out of the opening, a guide therefor, means for actuating the core, an angle bar interposed between the frame members, a pivot rod extending therethrough and journaled within the frame members, arms extending perpendicularly from one face of the angle bar and having flanges, a pallet detachably secured to said flanges, brackets extending from the bar and at right angles to the arms, a face plate adjustably and detachably connected to said brackets, arms parallel and movable with the brackets, end plates hingedly connected to said arms and movable between the pallet and the back plate and onto the face plate, and coöperating means upon the end plates and the pallet supporting arms for locking the end plates in such positions.

2. The combination with a supporting structure, and angular frame members secured thereon, of a core receiving back plate fixedly connected to the frame members, binding lugs extending inwardly from said frame members, an angle bar interposed between the frame members, a pivot rod extending through the angle bar and frame members, brackets extending perpendicularly from the angle bar, a face plate adjustably and detachably mounted thereon, arms extending perpendicularly from the angle bar and at right angles to said bracket, a pallet detachably and adjustably connected to said arms, arms extending from the angle bar and parallel with the brackets, end plates hingedly connected to said arms and movable into positions on the face plate and between the pallet and the back plate, fingers extending laterally from the pallet supporting arms, latch members upon the fingers, means upon the end plates for engaging the latches to hold the end plates in active positions, and a wedging projection movable with each end plate and into engagement with one of the binding lugs to hold the plates in active positions.

3. In a molding machine, the combination with a hingedly supported element and means adjustably connected thereto for supporting a face plate, of a pallet connected to and mounted to swing relative to said element, said pallet being normally mounted upon the inner face of said element and upon the working face of the face plate.

In testimony that I claim the foregoing as my own, I have hereto affixed my signature in the presence of two witnesses.

LUKE T. LOWE.

Witnesses:
 D. BURSON,
 A. L. OSBORNE.

---

Copies of this patent may be obtained for five cents each, by addressing the "Commissioner of Patents, Washington, D. C."